United States Patent
Yang

(10) Patent No.: US 7,240,684 B2
(45) Date of Patent: Jul. 10, 2007

(54) RAIN AND SUN SHELTER FOR AUTOMOBILES

(76) Inventor: Ching-Tse Yang, No. 79, Alley 45, Lane 280, Mincyuan E. Rd., Sec. 6, Neihu District, Taipei (TW)

( * ) Notice: Subject to any disclaimer, the term of this patent is extended or adjusted under 35 U.S.C. 154(b) by 327 days.

(21) Appl. No.: 10/819,163

(22) Filed: Apr. 7, 2004

(65) Prior Publication Data

US 2005/0224105 A1    Oct. 13, 2005

(51) Int. Cl.
    *E04H 15/06* (2006.01)
(52) U.S. Cl. .................. 135/88.07; 135/88.08
(58) Field of Classification Search ............ 135/88.05, 135/88.06, 88.07, 88.08, 88.1, 88.11, 88.13, 135/88.14, 88.16; 296/136.12
    See application file for complete search history.

(56) References Cited

U.S. PATENT DOCUMENTS

| | | | | |
|---|---|---|---|---|
| 2,306,537 A * | 12/1942 | Hamm | ................ | 135/88.1 |
| 2,496,085 A * | 1/1950 | Engelheart | ............ | 135/161 |
| 2,508,757 A * | 5/1950 | Gray | ................ | 135/88.08 |
| 3,068,046 A * | 12/1962 | Bourgoin | ............ | 296/95.1 |
| 3,952,758 A * | 4/1976 | Addison et al. | ........ | 135/88.07 |
| 3,957,301 A * | 5/1976 | Huber | ................ | 296/95.1 |
| 4,432,581 A * | 2/1984 | Guma | ................ | 296/136.03 |
| 4,684,165 A * | 8/1987 | Becker | ............ | 296/136.12 |
| 4,998,768 A * | 3/1991 | Wu | ................ | 296/136.12 |
| 5,066,065 A * | 11/1991 | Baughman | ............ | 296/165 |
| 5,197,503 A * | 3/1993 | Chen | ................ | 135/88.07 |
| 5,244,245 A * | 9/1993 | Kashino | ............ | 296/136.11 |
| 6,257,259 B1 * | 7/2001 | Ardouin | ............ | 135/88.07 |

OTHER PUBLICATIONS

WO 91/18164, Flores, Portable Cover System and Method for Vehicular Use, Nov. 28, 1991.*

* cited by examiner

*Primary Examiner*—Tamara L. Graysay
(74) *Attorney, Agent, or Firm*—Troxell Law Office PLLC

(57) ABSTRACT

The present invention discloses a rain and sun shelter for automobiles, which comprises a plurality of supporting stands, and one end of the supporting stand being installed onto a car, and an adjacent supporting stand having a horizontal rod movably disposed between the other end, and a canopy movably disposed on the horizontal rod. The canopy is supported by the supporting stand and keeps a specific distance with the car, such that a heat-insulating space is kept between the canopy and the car body, so that the heat absorbed by the canopy will not be dispersed through the heat insulating space into the car, and the rain water or other fluid blocked by the canopy will not drop on the car roof, and thus attaining the sun shelter and rain shelter effects.

7 Claims, 9 Drawing Sheets

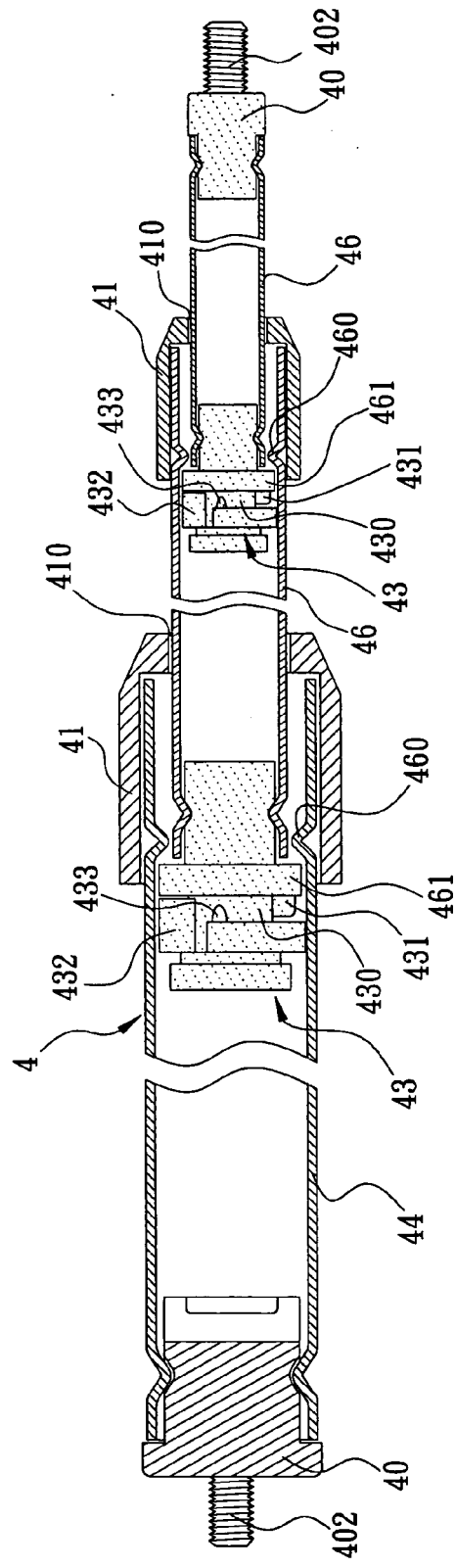
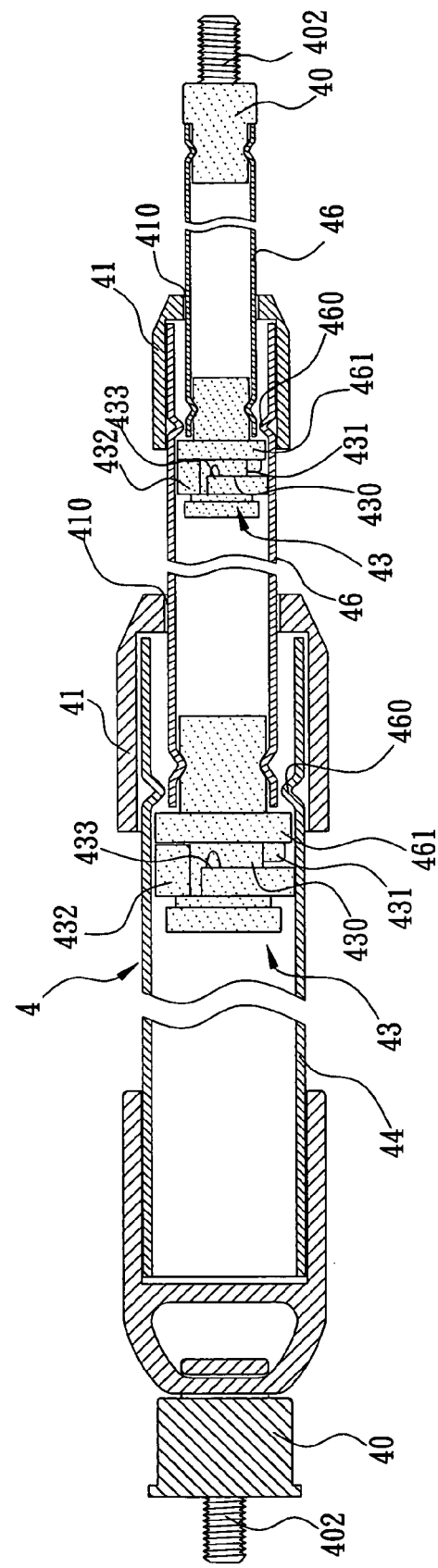
FIG. 6
FIG. 7

RAIN AND SUN SHELTER FOR AUTOMOBILES

FIELD OF THE INVENTION

The present invention relates to a shelter, more particularly to a rain and sun shelter for automobiles.

BACKGROUND OF THE INVENTION

In cities, more and more people are using cars as transportation means; however, in the densely populated cities or commercial areas, there are not enough basement parking lots or roofed garages. Therefore, a vast majority of cars are parked in the space without a shelter when they are not in use, and the cars are then exposed under the sun or the rain. In addition, the change of the atmospheric environment of the earth, the rising of outdoor ultraviolet index, the increased concentration of the acid rain, and the warming earth cause a drastic increase of outdoor temperature, so that the cars parked outdoors are corroded by acid rain and strong sunlight, which expedite the deterioration of the car body, materials, and components and the car for its depreciation.

Therefore, many engineers have tried to invent a sun shelter to go with the car, which can be stored and installed at the car roof. However, the sun shelter come with the car generally can only shelter the area of the car roof, and devices of this short have the effect of sheltering such a small area, and cannot be extended to the spaces above both sides of the car for a rain and sun shelter with a larger area. The primary cause of the traditional sun shelter come with the car is the lack of a proper and simple stand structure to support the extended rain and sun shelter to both sides of the car, and thus is unable to provide a better sheltering effect.

There is a traditional sheltering canopy installed onto a driving instructor's car, which comprises a fixed frame disposed at a car roof, a movable rack pivotally coupled on both sides of the car door of the car proximate to the fixed frame, a rain canopy being disposed respectively on the fixed frame and the movable rack, such that a driving student can rotate the movable rack and extend it to the positions on both sides of the car, and then continue practicing the driving skill. However, the volume of the fixed frame is huge, heavy, difficult to be removed after being mounted at the car roof without appropriate hand tools, and unable to be folded and stored inside the car, and thus adversely affecting the driving resistance of the car, and giving a very disagreeable and odd look.

Further, there is another tradition rainproof cover, which can surround and attach the body including the roof of a car tightly for the rain shelter purpose. However, moisture is gathered inside the rainproof cover for long time with difficult of being dispersed, not only causing damages to the rainproof cover easily, but also expedite the corrosion and deterioration of the car body, materials, and components due to the massive impurities contained in the moisture. Furthermore, the rainproof cover almost attaches onto the exterior of the car, it is unable to give an effective sun shelter and heat insulation effects.

Thus, it is definitely what consumers love to see, if a shelter that can shelter rains and sunlight, easy to install and remove, and easy to carry.

SUMMARY OF THE INVENTION

The primary objective of the present invention is to provide a rain and sun shelter for automobiles, which comprises a plurality of supporting stands, and one end of the supporting stand being installed onto a car, and an adjacent supporting stand having a horizontal rod movably disposed between the other end, and a canopy movably disposed on the horizontal rod. The canopy is supported by the supporting stand and keeps a specific distance with the car, such that a heat-insulating space is kept between the canopy and the car body, so that the heat absorbed by the canopy will not be dispersed through the heat insulating space into the car, and the rain water or other fluid blocked by the canopy will not drop on the car roof, and thus attaining the sun shelter and rain shelter effects. It will also prevent dust, fallen leaves and other dirty materials from adhering and contaminating the surface of the car and keep the car having a shining outlook for a long period of time.

Another objective of the present invention is to provide a sun and rain shelter for automobiles having a supporting stand, and the supporting stand comprises a base, a supporting rod, and a connecting base, wherein one end of the base is coupled with the supporting rod, and the other end having a plurality of sucking members, so that the supporting stand can be installed onto a car roof by the sucking members, and the end on the back of the supporting rod is pivotally coupled with the connecting base, so that the supporting rod and the connecting base can be rotated at the pivotally coupled positions and folded together, and a horizontal rod passes between the adjacent connecting base. Since the connecting base and the supporting rod are pivotally coupled as a whole, therefore when such device is disassembled, it can prevent the problem of missing the connecting base after the device is disassembled, and also can save the time of installing the connecting base and the supporting rod.

The above and other objects, features and advantages of the present invention will become apparent from the following detailed description taken with the accompanying drawings.

BRIEF DESCRIPTION OF THE DRAWINGS

FIG. 6 is an illustrative view of the first rod being connected to the second rod according to the present invention.

FIG. 7 is another illustrative view of the first rod being connected to the second rod according to the present invention.

DETAILED DESCRIPTION OF THE PREFERRED EMBODIMENTS

Figure 1:
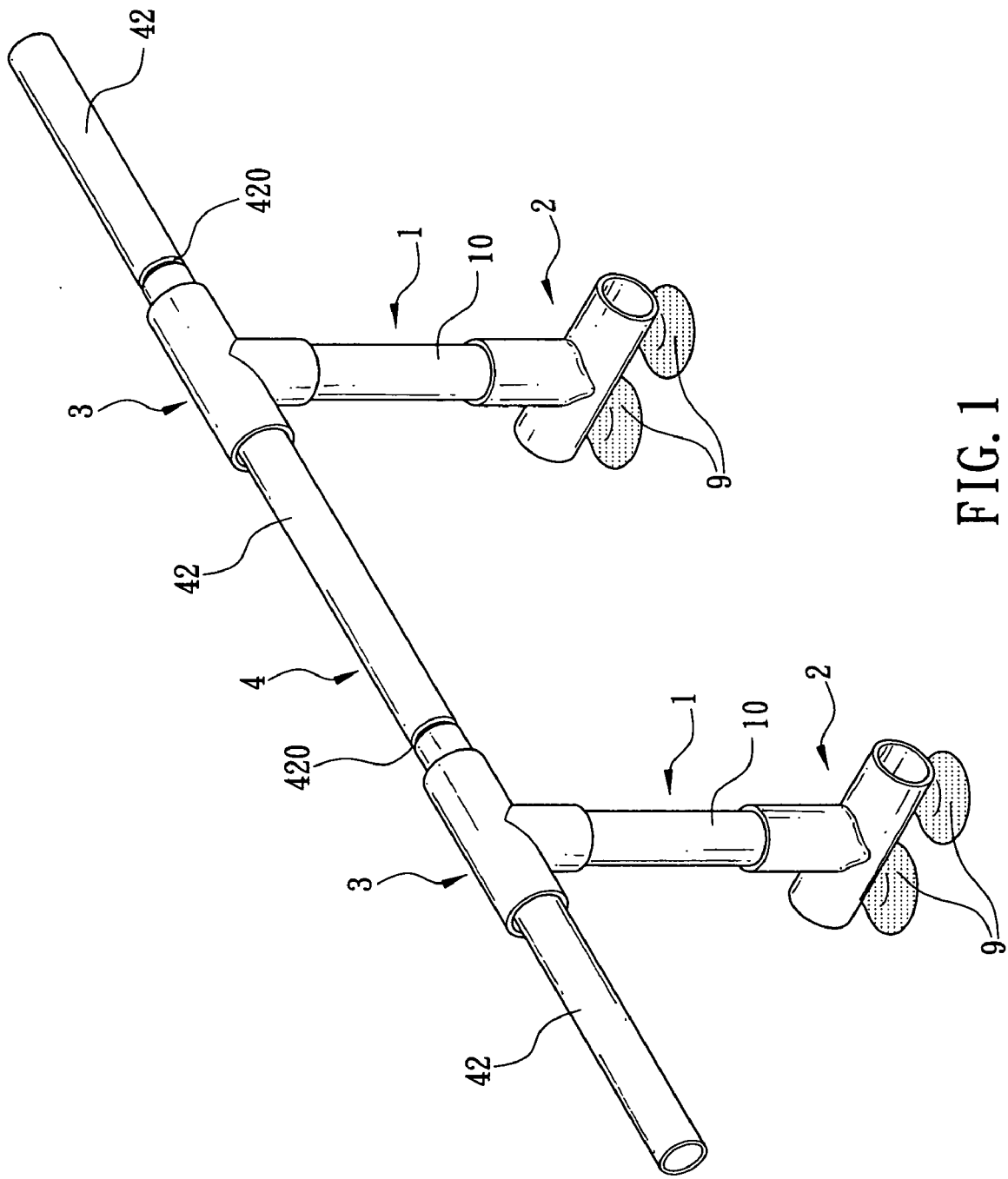
FIG. 1 is an illustrative view of the connections of the rain and sun shelter for automobiles according to the present invention.

The present invention discloses a rain and sun shelter for automobiles having a supporting stand. Please refer to FIG. 1 for the present invention, which comprises a plurality of supporting stands 1, and these supporting stands respectively have a supporting rod 10, and a base 2 is movably coupled to one end of the supporting rod 10, and the base 2 can be installed onto a car (as shown in FIG. 1), and a connecting base 3 is movably disposed at the other end of the supporting rod 10, and a horizontal rod 4 is disposed adjacent to the connecting base 3, and the horizontal rod 4 is coupled and perpendicular to the base 2, so that the horizontal rod 4 and the base 2 can support each other without falling off easily. A canopy 6 is disposed on the horizontal rod 4, and the canopy 6 can be spread out to cover the horizontal rod 4.

Figure 3:
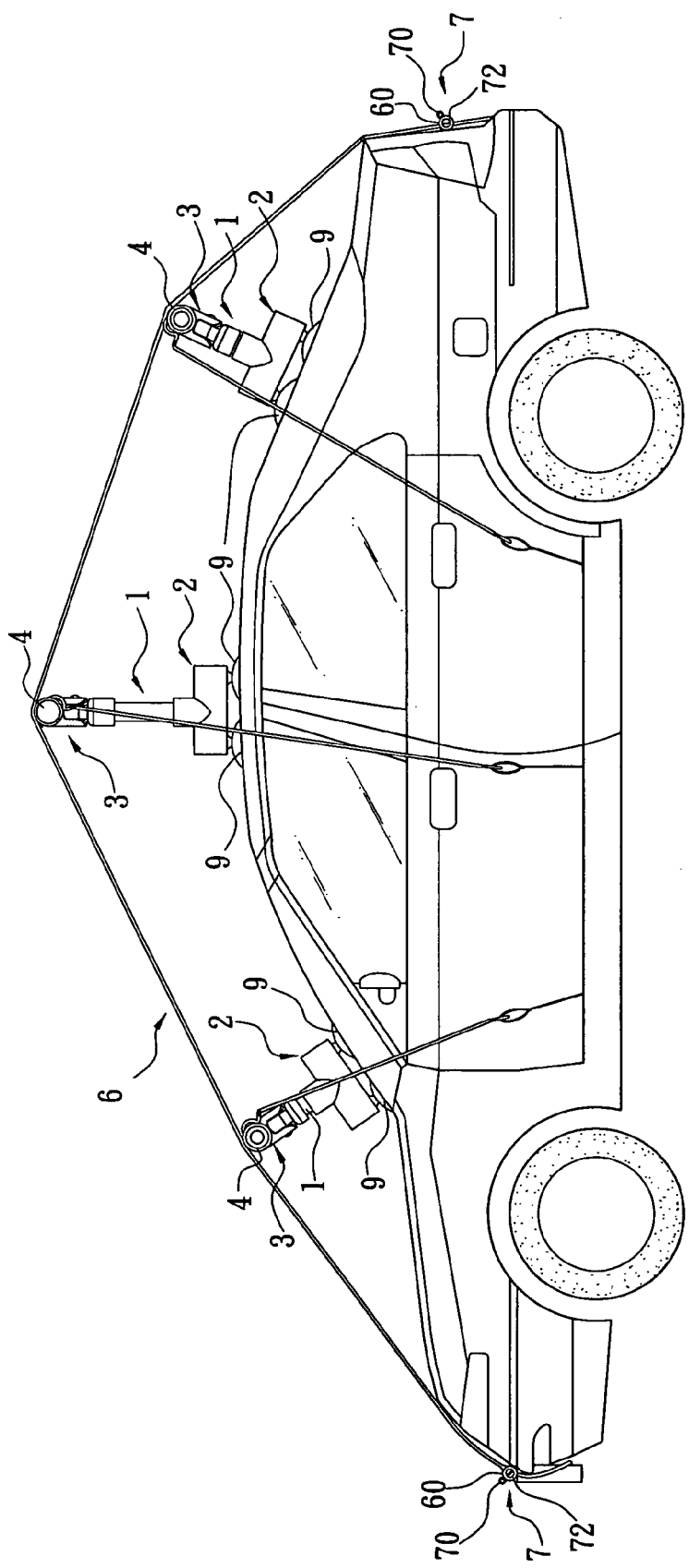
FIG. 3 is an illustrative view of the rain and sun shelter being for automobiles installed at the car roof according to the present invention.

Please refer to FIG. 3. A distance is kept between the canopy 6 and the car by the supporting stand 1, so that a heat-insulating space is defined between the canopy 6 and the car roof. The partition of the insulating space prevents the heat from transmitting directly into the car. If a supporting rod 10 of different heights is installed at different position of the car roof, so that the supporting rods obtain appropriate different heights. Therefore, the canopy 6 is aslant gradually from the highest point of the supporting rod 10 towards both sides of the car to constitute an appropriate slope in order to prevent the rain water or other fluids from dropping directly on the car roof, but dropping rain water or other fluid will flow towards the periphery of the canopy instead of gathering on the canopy 6. It will also prevent dust, fallen leaves and other dirty materials from adhering and contaminating the surface of the car and keep the car having a shining outlook for a long period of time. Furthermore, the supporting rods 10, base 2, connecting base 3, and horizontal rod 4 can be disassembled into individual modules to facilitate their storage.

Figure 2:
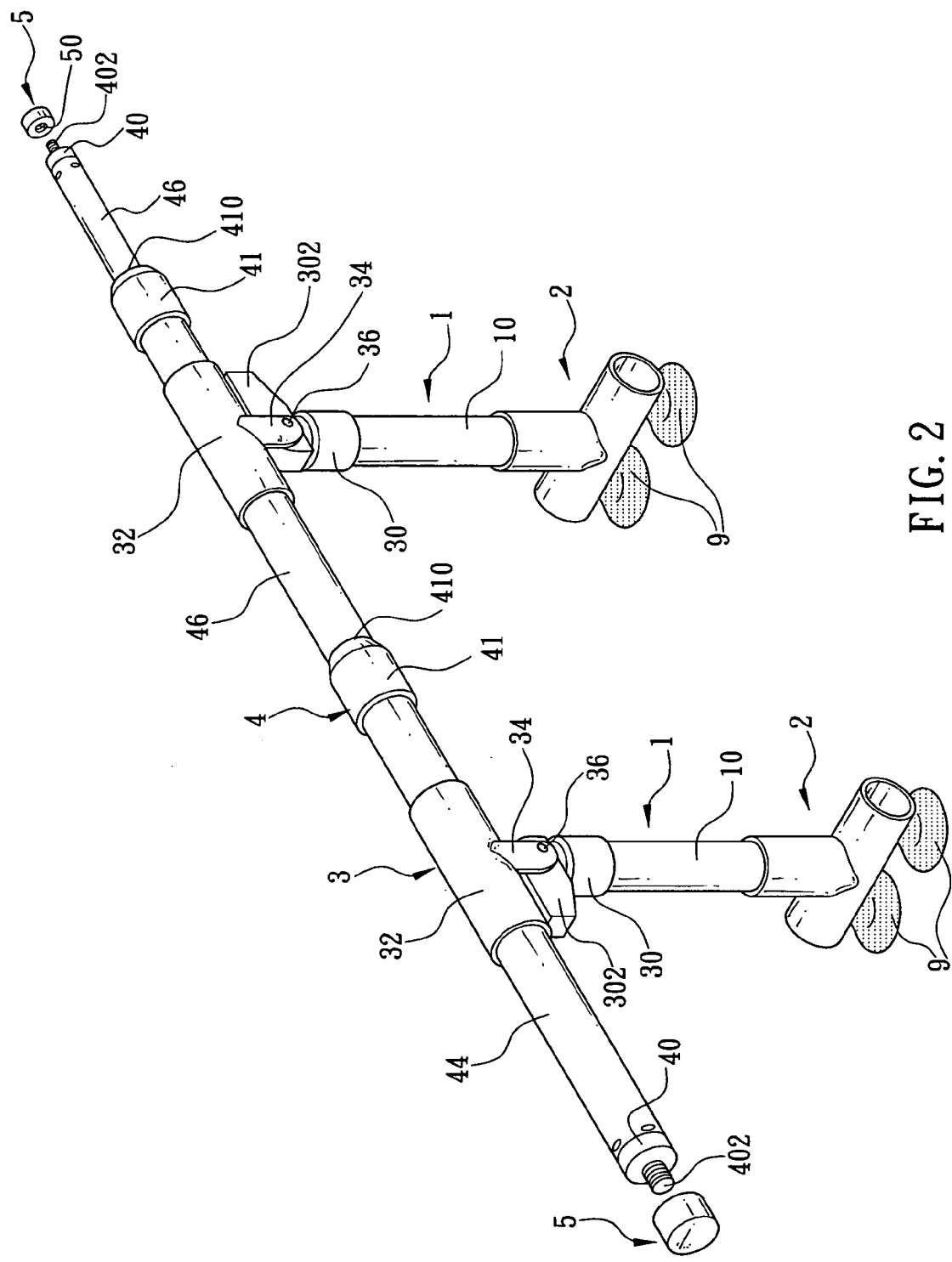
FIG. 2 is another illustrative view of the connections of the rain and sun shelter for automobiles according to the present invention.
Figure 4:
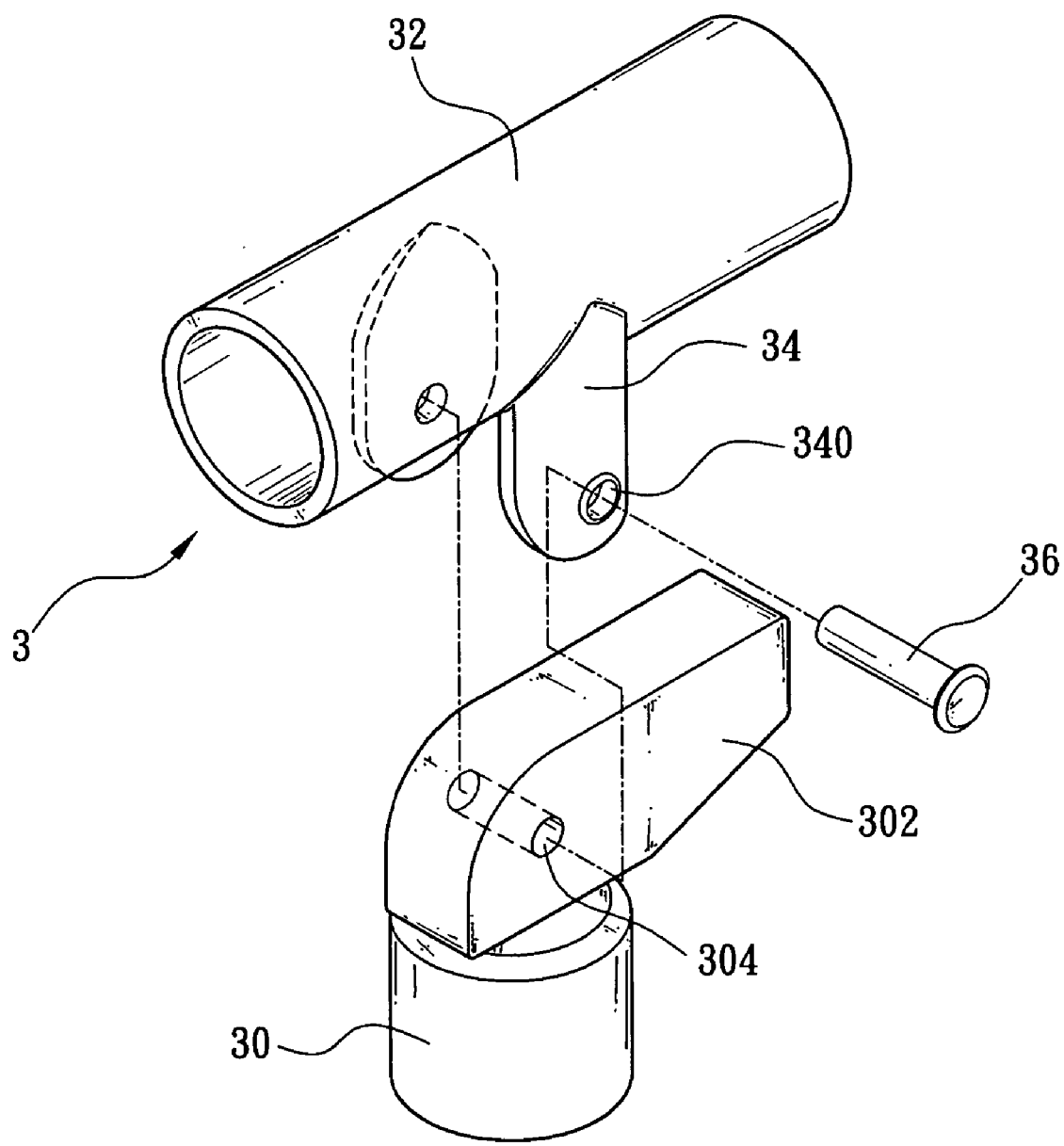
FIG. 4 is an illustrative view of the disassembled parts of the connecting base and the pivotal connecting base according to the present invention.

Please refer to FIGS. 2 and 4 for a preferred embodiment of the present invention. In the figures, a pivotal connecting base 30 is disposed between the supporting rod 10 and the connecting base 3, and one end of the pivotal connecting base 30 is coupled to an end of the supporting rod 10 that faces the connecting base 3, and a lump member 302 is disposed on another end of the pivotal connecting base 30. One side of the lump member 302 is extended to an appropriate length, and a through hole 304 is disposed thereon, and the connecting base 3 is comprised of a hollow pipe 32 and a two-plate member 34, wherein the horizontal rod 4 is passed through the interior of the hollow pipe 32 and the two-plate member 34 is disposed on the surface of the hollow pipe 32, and the lump member is precisely disposed in the gap between the two plates of the two-plate member 34. Further, the two-plate member 34 has a round hole 340 at the corresponding position of the two-plate member 34, and an axle rod 36 passes through the through holes 304 and round holes 340, such that the axle rod 36 pivotally coupled between the gap of the two-plate member 34 pivotally couples the pivotal connecting base 30 and the connecting base 3. Therefore, when the pivotal connecting base 30 and the connecting base 3 rotate along the axle rod 36, the extended side of the lump member 302 attaches the connecting base 3, and when the lump member 302 is extended in the opposite direction or the corresponding direction, the lump member 302 strengthens the support by the external sideway force of the horizontal rod 4 and the connecting base 3, so that the supporting rod 10 will not fall due to the external forces. When the supporting device of the rain and sun shelter for automobiles is installed or removed, the supporting rods 10 can be folded to a position parallel to the horizontal rod 4 since the supporting rods 10 are pivotally coupled with the connecting base 3 in order to save the time of repeatedly installing the supporting rods 10, base 2; connecting base 3, and horizontal rod 4, and also prevent the supporting rods 10, base 2, connecting base 3, and horizontal rod 4 from missing, and thus facilitating users to install the device anytime.

Please refer to FIG. 2 for the preferred embodiment again. A connecting member 40 is disposed on each end of the horizontal rod 4; a threaded section 402 is disposed on the connecting member 40; a connecting section is disposed precisely on the connecting member 40; another threaded section 50 corresponsive to the threaded section 402 is disposed on conjoined section 5, such that the section of canopy 6 protruded from both ends of the horizontal rod 4 is pulled close to both ends of the horizontal rod 4, and another threaded section 50 is coupled to the threaded section 402 by screws, and then the conjoined section 5 mounts the canopy 6 on the horizontal rod 4.

Please refer to FIG. 3 for another preferred embodiment of the present invention. The rain and sun shelter for automobiles further comprises two fixtures 7 respectively disposed at both ends of the canopy 6 for being latched onto a car (such as the license plate frame in the front or the trunk at the back) to mount the canopy 6 onto the car more securely. The fixture 7 comprises a string 70 and a reinforced rod 72, and the reinforced rod 72 has two holes 720 and both ends of the string 70 pass through the two holes 720 to be fixed onto the reinforced rod 72 and the string 70 is tied to the buckles of the license plate in the front and the trunk at the back to mount the canopy 6 onto the car.

In this embodiment, a plurality of sleeving sections 60 is disposed on the positions proximate to both ends of the canopy 6 for inserting the reinforced rod 72 into the sleeving sections 60 at different positions to fit the lengths of car bodies of different cars and pull the canopy 6 flat, so that the canopy 6 will not shake with the wind.

Figure 5:
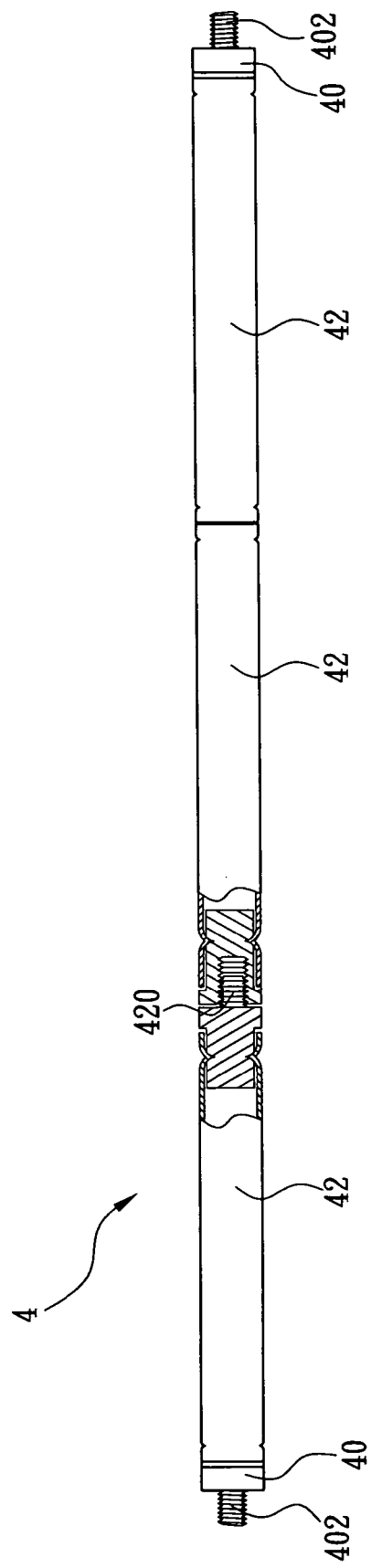
FIG. 5 is an illustrative view of the connection of the rods according to the present invention.

Please refer to FIG. 5 for another preferred embodiment of the present invention. The horizontal rod 4 is comprised of a plurality of rods 42, and these rods 42 have a connecting section 420 at the corresponding end of the rods 42, such that the connecting section 420 between the rods 42 connects the rods 42.

Please refer to FIGS. 6 and 7 for another preferred embodiment of the present invention. The horizontal rod 4 is comprised of a first rod 44, a plurality of second rods 46 disposed sequentially inside the first rod 44, wherein a hollow sheath 41 is disposed at the position of an end of the first rod 44 and an end of the second rod 46 and having an opening 410, so that the second rod 46 adjacent to the first rod 44 and a second rod 46 adjacent to the second rods 46 can be extended out or withdrawn from the opening 410, and the extended end of the first rod 44 and the second rod 46 has a concave ring section 460 and a convex member 461, such that when the second rod 46 is shifted into the concave ring section 460 to attach to the convex member 461, the second rod 46 cannot be extended outward.

Figure 8:
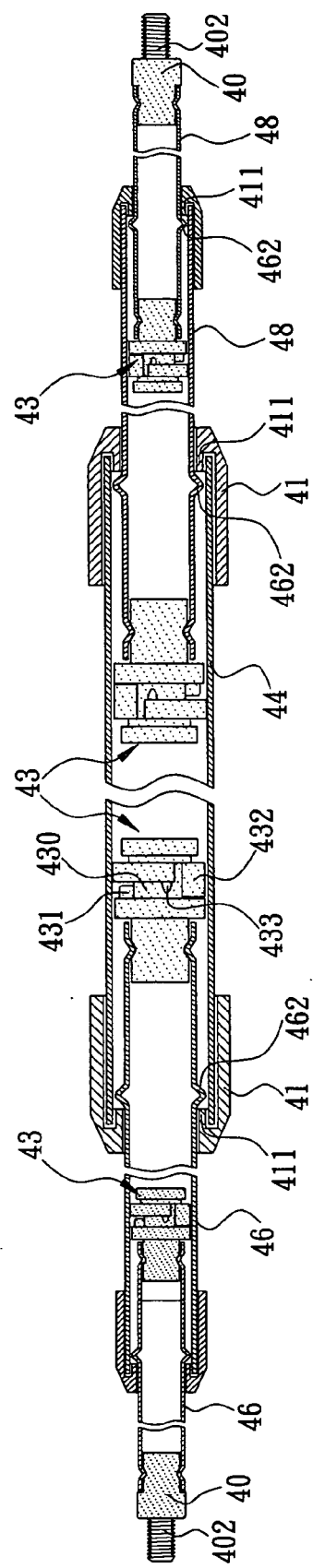
FIG. 8 is an illustrative view of the connection between the first rod, the second rod, and the third rod according to the present invention.

To provide more choices for different lengths of the horizontal rod 4 to be used in different occasions, another preferred embodiment according to the present invention is shown in FIG. 8. A plurality of second rods 46 is disposed sequentially at one end of a first rod 44 inside the first rod 44, and a plurality of third rods 48 is disposed sequentially inside the first rod 44 at the other end. The external diameters of the second rod 46 and the corresponding rod 48 are equal, so that the corresponding ends of the second rod 46 and the third rod 48 can be attached together instead of being sheathed together. A hollow sheath 41 is disposed on both extended ends of the first rod 44 and the extended ends of the second rod 46 and the third rod 48; a limit section 411 is disposed inside both ends of the first rod 44 and outside the second rod 46 and the third rod 48; and at least one protrusion 462 is disposed at another ends of the second rod 46 and the third rod 48, such that when the second rod 46 and the third rod 48 are shifted to the protrusion 462 to attach onto the limit section 411, the second rod 46 and the third rod 48 cannot be extended outward anymore.

In these embodiments, a latching section 43 is disposed at another ends of the second rod 46 and the third rod 48, and the latching section 43 comprises an eccentric shaft 430 and an eccentric member 432, and a protruded member 431 is disposed on the surface of the eccentric shaft 430, and the eccentric member 432 is hollow and disposed on the eccentric shaft 430, and another protruded member 433 is disposed on one end, such that when the second rod 46 or the third rod 48 is rotated, the eccentric shaft 430 presses against an inner wall of the eccentric member 432, so that the eccentric member 432 is extended outward gradually to press on the inner walls of the first rod 44, the second rod 46, and the third rod 48. As a result, the second rod 46 and the third rod 48 cannot be pulled out or withdrawn. Such arrangement gives a more convenient way for using and storing the horizontal rod 4.

Please refer to FIG. 2 for the present invention. The length of the horizontal rod 4 is longer than the width of the car, and the width of the canopy 6 is larger than the length of the horizontal rod 4, so that the canopy 6 is fixed on both ends of the horizontal rod 4 by the conjoined section 5. Further, the horizontal rod 4 can be moved to the left side or the right side of the car depending on the parking position of the car, and the canopy 6 can be moved according to the horizontal rod 4 anytime such that the canopy 6 and the horizontal rod 4 will not be in the way of the road or pedestrians.

Figure 9:
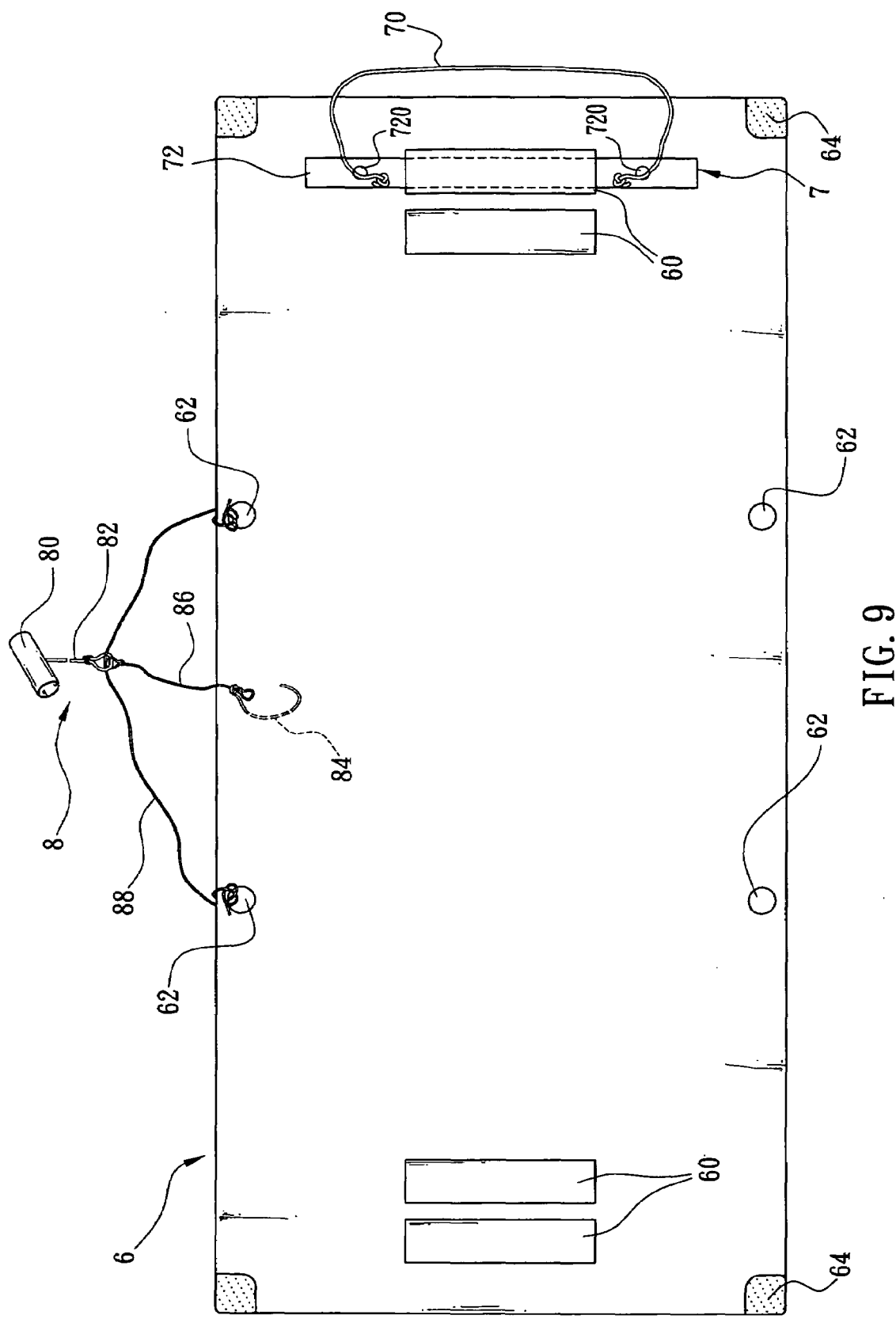
FIG. 9 is an illustrative view of the canopy according to the present invention.
Figure 10:
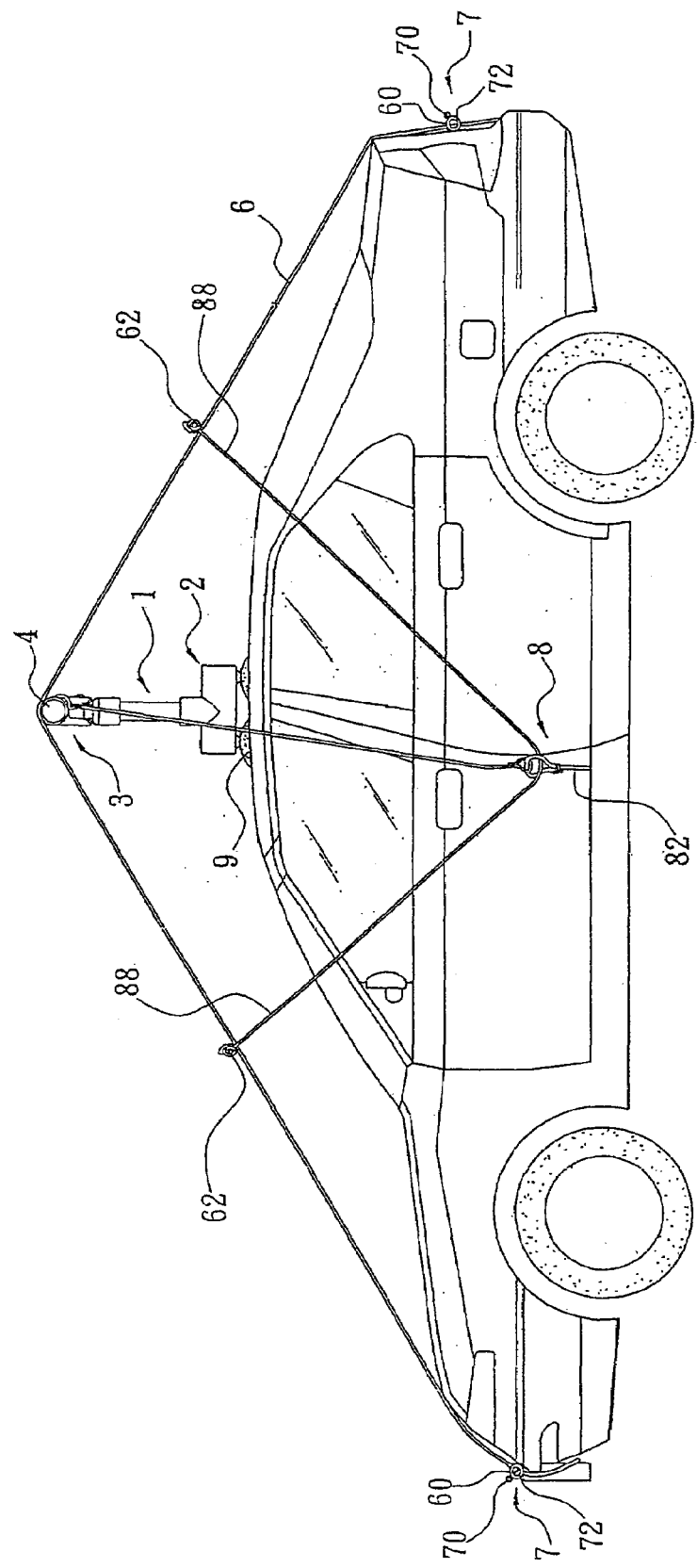
FIG. 10 is another illustrative view of the canopy being installed onto a car roof according to the present invention.

To prevent the canopy 6, horizontal rod 4, and supporting rod 10 from falling off from the car, a pulling fixture 8 is set for the present invention as shown in FIGS. 3, 9, and 10. The pulling fixture 8 comprises a fixed body 80, and extending string 82, and a flexible string 86, and a hook 84; wherein an end of the extending string 82 is connected into the fixed body 80, and the other end is connected to the flexible string 86. One end of the flexible string 86 is connected to the hook 84, so that the fixed body 80 can be placed on the inner side of the car door, and the extending string 82 is placed on the outer side of the car door. If the car door is closed to pull the extending string 82, the fixed body 80 is latched inside the car door. Then, the flexible string 86 is pulled to extend to an appropriate length and hook the hook 84 at the position where the horizontal rod 4 and the connecting base 3 are connected. Therefore, an appropriate pulling force is applied by the flexible string 86 at the position where the horizontal rod 4 and the connecting base 3 are connected, such that the horizontal rod 4 and the connecting base 3 will not fall down from the car roof easily. Since the pulling force of the pulling fixture 8 is applied onto the connecting base, therefore the horizontal rod 4 will not be pulled to deform by the pulling force, and the total length of the pulling fixture 8 is shorter than the total height from the bottom of the car door to the position where the horizontal rod 4 and the connecting base 3 are connected.

Since the canopy 6 is a thin object with a large area, therefore the canopy 6 will swing easily with the wind. Particularly, when a strong wind blows at the canopy 6, the canopy 6 will swing vigorously or even will cause the canopy 6, horizontal rod 4, and supporting rod 10 come off from the car. Therefore, in these embodiments as shown in FIGS. 9 and 10, the canopy 6 has a plurality of hook rings 62 disposed at the edges proximate to both ends of the canopy 6 for connecting to a connecting string 88, and the connecting string 88 can be connected to the extending string 82 (as shown in FIG. 10), so that the canopy 6 will not come off from the car. Further, a heavy object 64 can be attached to each corner of the canopy 6, such the corners of the canopy 6 are hang down naturally by the heavy objects 64 to prevent the corners of the canopy 6 from being blown about in the wind. In addition, text or patterns are set on one side of the canopy 6 facing the opposite side of the horizontal rod 4 for the advertising purpose, and the canopy 6 is made of an ultraviolet-proof and waterproof nylon cloth, aluminum insulating pad, or aluminum insulating air bubble pad. The properties of the materials of the nylon cloth, insulating pad, and air bubble pad enhance the insulating effect.

In these embodiments, at least one sucking member 9 (such as a sucking disc or a magnet) is disposed at the position where the base 2 and car roof are in contact. The sucking member 9 secures the base 2 together with the car roof. The length of the horizontal rod 4 exceeds the width of the car, and there is a buffer space between the horizontal rod 4 and the connecting base 3 for allowing the horizontal rod 4 to move to the left and right sides, and the canopy 6 can also be moved with the horizontal rod 4, such that the canopy 6 and the horizontal rod 4 will not be in the way of the road or pedestrians.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

While the invention has been described by means of specific embodiments, numerous modifications and variations could be made thereto by those skilled in the art without departing from the scope and spirit of the invention set forth in the claims.

What is claimed is:

1. A rain and sun shelter for automobiles, comprising:
a plurality of supporting stands, each having a base, a support rod being disposed on an end of said base, a plurality of sucking members being disposed on the other end of said base, whereby said plurality of supporting stands being installable onto a car roof of an automobile, and a connecting base disposed on an end of said supporting rod away from the base;
at least one horizontal rod, being movably coupled onto said connecting base and perpendicular to said base;
a canopy being movably coupled to said horizontal rod and spread on said horizontal rod, thereby keeping a specified distance between said canopy and said car roof defining an heat-insulating space between said canopy and said car roof;

a pivotal connecting base disposed between said supporting rod and said connecting base, and one end of said pivotal connecting base being fixed onto one end of said supporting rod away from said connecting base, the other end of said pivotal connecting base having a lump member with one side extended to an appropriate length, and said lump member having a through hole; and, said connecting base comprising a hollow pipe and a two-plate member, wherein said hollow pipe is provided for passing said horizontal rod therein, said two-plate member disposed on the surface of said hollow pipe, a gap disposed between two plates of said two-plate member for installing said lump member, and said two-plate member comprises a round hole on the corresponding position of said two-plate member so that an axle rod passes through said through hole and said round holes to pivotally couple said pivotal connecting base with said connecting base.

2. The rain and sun shelter for automobiles of claim 1, wherein said horizontal rod comprises a connecting member on both ends, and said connecting member has a thread section, and a conjoined section precisely connected with said connecting member, and said conjoined section comprises another thread section corresponsive to said thread section, so that said conjoined section mounts said canopy onto said horizontal rod by screwing said thread section with said another thread section.

3. The rain and sun shelter for automobiles of claim 1, wherein said horizontal rod comprises a first rod and a plurality of second rods sequentially disposed in said first rod, and a hollow pipe is disposed at an end of said first rod and an end of one of said second rods, and an opening is disposed on said hollow pipe for allowing each said second rod adjacent and inside said first rod and said each second rod adjacent and inside each said sequentially disposed second rods to extend or withdraw, and a concave ring section is disposed at the end of said first rod adjacent said second rod, and a convex member is disposed on the end of said second rod adjacent said first rod, and said convex member presses on said concave ring section;

a latching section is disposed at an end of said second rod proximate to said first rod, and said latching section comprises an eccentric shaft and an eccentric member, and said eccentric shaft at its surface has a first protruded member, and said eccentric member is hollow and disposed on said eccentric shaft and has a second protruded member.

4. The rain and sun shelter for automobiles of claim 1, wherein said horizontal rod comprises a first rod, one end of said first rod comprises a plurality of second rods sequentially disposed and the other end of said first rod comprises a plurality of third rods, sequentially disposed and the external diameters of said second rods and said corresponding third rods are equal, so that said second rod is coupled next to the corresponding end of said third rod without being sheathed together, and a hollow pipe is disposed individually at both ends of said first rod and the adjacent ends of said second rod and said third rod, and a limit section is disposed individually at both ends of said first rod, at least one protrusion is disposed individually at the periphery of said second rod and said third rod, and each protrusion presses on said respective limit section;

a latching section is disposed individually at ends of said second rods and said third rods proximate to said first rod, and said latching section comprises an eccentric shaft and an eccentric member, and a first protruded member is disposed on the surface of said eccentric shaft, and said eccentric member is hollow and disposed on said eccentric shaft, and a second protruded member is disposed on said eccentric shaft.

5. The rain and sun shelter for automobiles of claim 1 further comprising a pulling fixture having a fixed body, an extending string, a flexible string, and a hook sequentially; wherein one end of said extending string is coupled into said fixed body and the other end of said extending string is coupled to an end of said flexible string, and the other end of said flexible string is coupled to said hook, and said fixed body is adapted to be mounted onto an inner side of a car door, and the other end of said flexible string is fixed onto an outer side of said car door, and said hook hooks on a position where said horizontal rod and said connecting base are coupled.

6. The rain and sun shelter for automobiles of claim 1, wherein said canopy comprises a plurality of hook rings disposed at both end proximate to the edge of said canopy for being connected a connecting string, and said connecting string is connected to an extending string.

7. The rain and sun shelter for automobiles of claim 1 further comprising two fixtures are disposed respectively on both ends proximate to the edge of said canopy, and said canopy is adapted to be fixed onto said car by said fixtures, and said each of fixture comprises:

a reinforced rod, having two holes thereon;

a sheathing string, with both ends passing through said two holes respectively and being adapted to be mounted onto said car.

* * * * *